US010126010B2

(12) United States Patent
Chen et al.

(10) Patent No.: US 10,126,010 B2
(45) Date of Patent: Nov. 13, 2018

(54) CONTROLLING SYSTEM FOR ENVIRONMENTAL COMFORT DEGREE AND CONTROLLING METHOD OF THE CONTROLLING SYSTEM

(71) Applicant: DELTA ELECTRONICS, INC., Taoyuan County (TW)

(72) Inventors: Meng-Seng Chen, Taoyuan County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 238 days.

(21) Appl. No.: 14/936,085

(22) Filed: Nov. 9, 2015

(65) Prior Publication Data

US 2016/0161137 A1    Jun. 9, 2016

(30) Foreign Application Priority Data

Dec. 4, 2014    (TW) .............................. 103142095 A

(51) Int. Cl.
*F24F 11/00* (2018.01)
*G05B 13/02* (2006.01)
(Continued)

(52) U.S. Cl.
CPC .............. *F24F 11/30* (2018.01); *F24F 11/62* (2018.01); *G05B 13/0265* (2013.01);
(Continued)

(58) Field of Classification Search
CPC ................. F24F 11/006; F24F 11/0034; F24F 2011/0057; F24F 2011/0026; G05B 13/0265; Y02B 30/78
See application file for complete search history.

(56) References Cited

U.S. PATENT DOCUMENTS 8,700,227 B2 * 4/2014 Vass ....................... G01K 1/045
                                                            700/276
2005/0284158 A1    12/2005 Lee et al.
(Continued)

FOREIGN PATENT DOCUMENTS

CN           102840647        12/2012
CN           202648705         1/2013
(Continued)

OTHER PUBLICATIONS

Office Action dated Mar. 15, 2016 from corresponding application No. TW 103142095.
(Continued)

*Primary Examiner* — Charles Kasenge
(74) *Attorney, Agent, or Firm* — Hauptman Ham, LLP

(57) ABSTRACT

A controlling method executes an auto-calculation procedure of a controlling system when a person is detected indoor. The auto-calculation procedure firstly collects current environment parameters via sensors for calculating a current comfort-index based on the sensed environment parameters. Secondly, it calculates a target temperature/humidity adjustment value for the environment to reach a best comfort-index based on the current comfort-index. Then, it controls indoor apparatuses based on the calculated target temperature/humidity adjustment value to adjust the environment to be in the best comfort-index. The controlling system can execute a learning procedure, it records the current environment parameters and a user-feedback to build a learning model. Therefore, it helps the environment to satisfy user demands quickly by using the learning model directly when the indoor environment has the environment parameters same as the learning model.

17 Claims, 8 Drawing Sheets

(51) Int. Cl.
  *F24F 11/30* (2018.01)
  *F24F 11/62* (2018.01)
  *F24F 110/70* (2018.01)
  *F24F 120/10* (2018.01)
  *F24F 120/20* (2018.01)

(52) U.S. Cl.
  CPC ....... *F24F 2110/70* (2018.01); *F24F 2120/10* (2018.01); *F24F 2120/20* (2018.01)

(56) References Cited

U.S. PATENT DOCUMENTS

| | | | |
|---|---|---|---|
| 2006/0184283 A1 | 8/2006 | Lee et al. | |
| 2007/0138307 A1* | 6/2007 | Khoo | F24F 11/006 236/1 C |
| 2007/0240437 A1* | 10/2007 | Yonezawa | F24F 11/001 62/176.1 |
| 2010/0036533 A1* | 2/2010 | Masuda | F24F 11/0034 700/278 |
| 2010/0262298 A1* | 10/2010 | Johnson | F24F 11/001 700/277 |
| 2010/0332044 A1* | 12/2010 | McLean | G06Q 10/06 700/291 |
| 2011/0093126 A1* | 4/2011 | Toba | G05B 15/02 700/291 |
| 2011/0202181 A1* | 8/2011 | Lee | F24F 11/0009 700/276 |
| 2011/0313579 A1* | 12/2011 | Ling | H04L 12/282 700/291 |
| 2012/0125559 A1* | 5/2012 | Fadell | F24F 11/0012 165/11.2 |
| 2012/0232715 A1* | 9/2012 | Vass | G01W 1/17 700/300 |
| 2013/0048263 A1 | 2/2013 | Nouvel et al. | |
| 2013/0158722 A1 | 6/2013 | Chen et al. | |
| 2013/0245847 A1* | 9/2013 | Steven | G06Q 50/06 700/291 |
| 2014/0142773 A1* | 5/2014 | Ling | G05B 13/02 700/291 |
| 2014/0148706 A1 | 5/2014 | Van Treeck et al. | |
| 2014/0277765 A1* | 9/2014 | Karimi | G05B 15/02 700/276 |
| 2014/0358291 A1* | 12/2014 | Wells | G05D 23/1902 700/276 |

FOREIGN PATENT DOCUMENTS

| | | |
|---|---|---|
| CN | 203719034 | 7/2014 |
| EP | 0495118 | 7/1992 |
| EP | 1691141 | 8/2006 |
| JP | H09196434 | 7/1997 |
| JP | 2006322624 | 11/2006 |
| JP | 2011190972 | 9/2011 |
| JP | 2013164260 | 8/2013 |
| KR | 20080095563 | 10/2008 |
| TW | I351494 | 11/2011 |
| TW | 201420970 | 6/2014 |
| WO | WO2011141506 | 11/2011 |

OTHER PUBLICATIONS

Office Action dated Sep. 20, 2016 from corresponding application No. JP 2015-237332.
Office Action dated Jun. 1, 2017 from corresponding application No. CN 201410734232.X.
European Search Report dated Aug. 24, 2016 from corresponding application No. EP 15195246.2.

* cited by examiner

CONTROLLING SYSTEM FOR ENVIRONMENTAL COMFORT DEGREE AND CONTROLLING METHOD OF THE CONTROLLING SYSTEM

BACKGROUND OF THE INVENTION

1. Field of the Invention

The invention relates to a controlling system, and in particularly to a controlling system and a controlling method for controlling indoor comfort degree.

2. Description of Prior Art

For making an indoor environment more comfortable, different kinds of indoor apparatuses, such as air-conditioners, dehumifying dryers, fans, etc., are necessary for people indoor nowadays.

Generally, most of the above indoor apparatuses are controlled manually by a user. In particularly, when the user enters into a room, he or she controls the indoor apparatuses manually to turn on/turn off or adjust temperature/humidity of the indoor environment when he or she feels uncomfortable, for example, the environment being too cold, too hot or too wet. The manual control is very inconvenient for the user.

For solving the problem caused by manual control, many automatic controlling systems are present in the market. However, those automatic controlling systems only execute simple auto-controls for the indoor apparatuses based on built-in default values, for example, keeping the temperature in 27° C. in the office, keeping the temperature in 25° C. in the factory, or keeping the temperature in holidays 1° C. higher than that in working days.

As mentioned above, those automatic controlling systems can solve the problem caused by manual control. However, different users have different senses, even same user has different feelings in different time (for example, winter and summer). As a result, the user still needs to adjust the indoor apparatuses manually via using the above automatic controlling systems when feeling uncomfortable indoor.

The above mentioned automatic controlling systems are usually not provided with learning function, and cannot record the setting related to manual adjustments from the user. Therefore, the user needs to adjust the indoor apparatuses manually to make the indoor environment satisfy his or her own demand even the user enters the same indoor environment again. It is to say, the automatic controlling systems mentioned above are not human friendly enough.

SUMMARY OF THE INVENTION

The object of the present invention is to provide a controlling system and a controlling method for controlling a comfort degree, which can adjust the comfort degree of an indoor environment automatically by controlling indoor apparatuses when a person is detected indoor.

The other object of the present invention is to provide the controlling system and the controlling method for controlling the comfort degree, which can calculate a target comfort temperature/humidity adjustment value for the indoor environment to reach a best comfort-index based on a current comfort-index, and can further control the indoor apparatuses to adjust the indoor environment to be in the best comfort-index.

The another object of the present invention is to provide the controlling system and the controlling method for controlling the comfort degree, which can records a user-feedback and current environment parameters to build a learning model. The present invention can helps the indoor environment to satisfy user demands quickly by using the pre-built learning model directly when the current indoor environment has the environment parameters same as the learning model.

According to the above objects, the controlling method in the present invention executes an auto-calculation procedure of a controlling system when a person is detected indoor. The auto-calculation procedure firstly collects the current environment parameters via sensors for calculating the current comfort-index based on the sensed current environment parameters. Secondly, it calculates the target comfort temperature/humidity adjustment value for the environment to reach the best comfort-index based on the current comfort-index. Then, it controls indoor apparatuses based on the calculated target comfort temperature/humidity adjustment value to adjust the environment to be in the best comfort-index.

Besides, the controlling system in the present invention can execute a learning procedure, the learning procedure records the current environment parameters and the user-feedback when the user-feedback is inputted by the user manually to build the learning model. Therefore, it helps the indoor environment to satisfy user demands quickly by using the learning model directly when the indoor environment has the environment parameters same as the learning model.

Comparing with prior art, the present invention can automatically control the indoor apparatuses via one or more modes of the controlling system when a person is detected indoor by the sensors, so as to adjust the indoor environment to reach the best comfort-index. Therefore, the user needs not to setup or control the indoor apparatuses (such as fans or air-conditioners) manually.

Furthermore, the controlling system of the present invention comprises an auto-calculation mode, and the controlling system in the auto-calculation mode can calculate the target comfort temperature/humidity adjustment value for the indoor environment to reach the best comfort-index based on the current comfort-index of the indoor environment. Therefore, the controlling system can control the indoor apparatuses by using the calculated target comfort temperature/humidity adjustment value directly. In this case, the comfort degree of the indoor environment can be adjusted to reach a target directly, and prevent the probability that the adjusted comfort degree of the indoor environment cannot satisfy the user demands.

The controlling system of the present invention can further comprise a learning mode, if the user cannot bear the current indoor environment and inputs the user-feedback manually, the controlling system in the learning mode can save the inputted user-feedback to build the learning model. Therefore, the controlling system can control the indoor apparatuses by using the pre-built learning model to help the indoor environment to reach the comfort degree needed by the user quickly if the indoor environment has the environment parameters same as the learning model.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
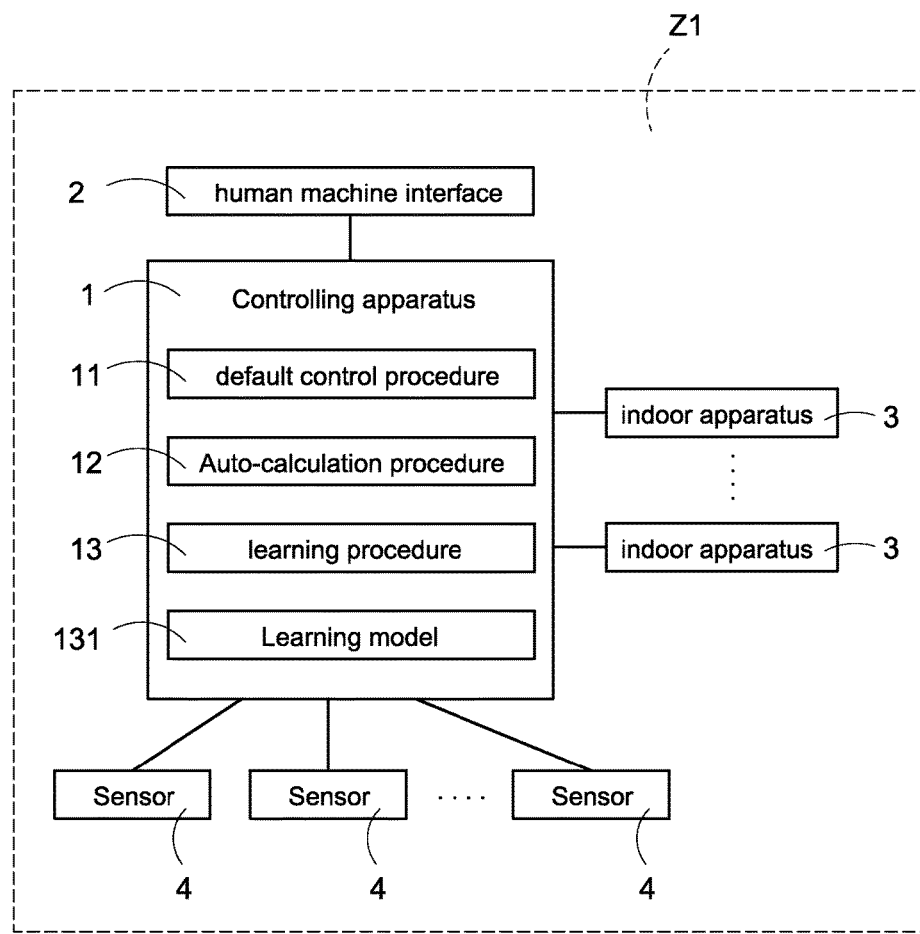
FIG. 1 is a schematic view of a controlling system of a first embodiment according to the present invention.

This invention discloses a controlling system for environmental comfort degree (referred to as the system hereinafter), and a controlling method for environmental comfort degree used by the system. FIG. 1 is a schematic view of a controlling system of a first embodiment according to the present invention. As shown in FIG. 1, the system mainly comprises a controlling apparatus 1, a human machine interface (HMI) 2, a plurality of indoor apparatuses 3 and a plurality of sensors 4. The controlling apparatus 1, the HMI 2 and the indoor apparatuses 3 are arranged in an indoor space Z1, and are implemented to adjust an indoor environment of the indoor space Z1. The plurality of sensors 4 can be arranged in the indoor space Z1, and also can be arranged out of the indoor space Z1, and the arranged sensors 4 are used to detect environment parameters indoor and/or outdoor.

The controlling apparatus 1 is a core of the system, and is operatively connected with the HMI 2, the indoor apparatuses 3 and the sensors 4. In this embodiment, the controlling apparatus 1 and the HMI 2 are two separate devices and electrically connected with each other through a physical cable (not shown). In other embodiments, the controlling apparatus 1 and the HMI 2 can be integrated together, but not limited thereto. Besides, the controlling apparatus 1 can also be connected with the indoor apparatuses 3 and the sensors 4 wirelessly through a local area network (LAN) or a network, but not limited thereto.

The controlling apparatus 1 comprises a memory (not shown), and the memory at least stores a default control procedure 11, an auto-calculation procedure 12 and a learning procedure 13. The default control procedure 11 is used to control the indoor apparatuses 3 according to default control parameters. The auto-calculation procedure 12 is used to execute automatic calculations based on indoor and/or outdoor environment parameters, and control the indoor apparatuses 3 according to the calculation result. The learning procedure 13 is used to records one or more user-feedback inputted by a user to build one or more learning models 131, and the controlling apparatus 1 controls the indoor apparatuses 3 according to the contents of a corresponding learning model 131 of the learning models 131 if the corresponding learning model 131 has the environment parameters same as the current indoor environment.

In this embodiment, the plurality of indoor apparatuses 3 are apparatuses arranged for adjusting the indoor environment of the indoor space Z1, such as air-conditioners, fans, dehumidifiers, circulation fans, etc. The plurality of indoor apparatuses 3 are controlled by the controlling apparatus 1 to operate to adjust a comfort degree of the indoor environment, so as to make the user in the indoor space Z1 feels comfortable.

The plurality of sensors 4 can be, basically, thermometers, hygrometers, wind speed detectors, IR detectors, etc. The sensors 4 are used to sense a plurality of environment parameters inside and/or outside of the indoor space Z1, such as temperature, radiant temperature, air velocity, humidity, activity of person and clothing of person.

The sensors 4 transmit the sensed environment parameters to the controlling apparatus 1 to calculate and record the sensed environment parameters at the controlling apparatus 1 before controlling. It should be mentioned is the controlling apparatus 1 can provide multiple modes related to the activity of person for the user to select through the HMI 2, for example, it can provide a factory mode or an office mode for the user to select, and each mode is corresponding to different type of the activity of person respectively. Besides, the controlling apparatus 1 can also provide the user to set the clothing of person through the HMI 2, for example, the user can set different climate or different season, and each climate/each season is corresponding to different type of the clothing of person respectively.

The HMI 2 mainly comprises a keyboard, a mouse, a monitor and/or a touch screen, but not limited thereto. The HMI 2 is used to display each information of the system, for example, the environment parameters mentioned above, a current comfort-index of the indoor space Z1, and an operating status of the indoor apparatuses 3, etc. In this invention, the HMI 2 can receive a manual operation from the user, and select a corresponding operating mode of the system, control the indoor apparatuses 3, and inquire the environment parameters based on the operation.

Figure 2:
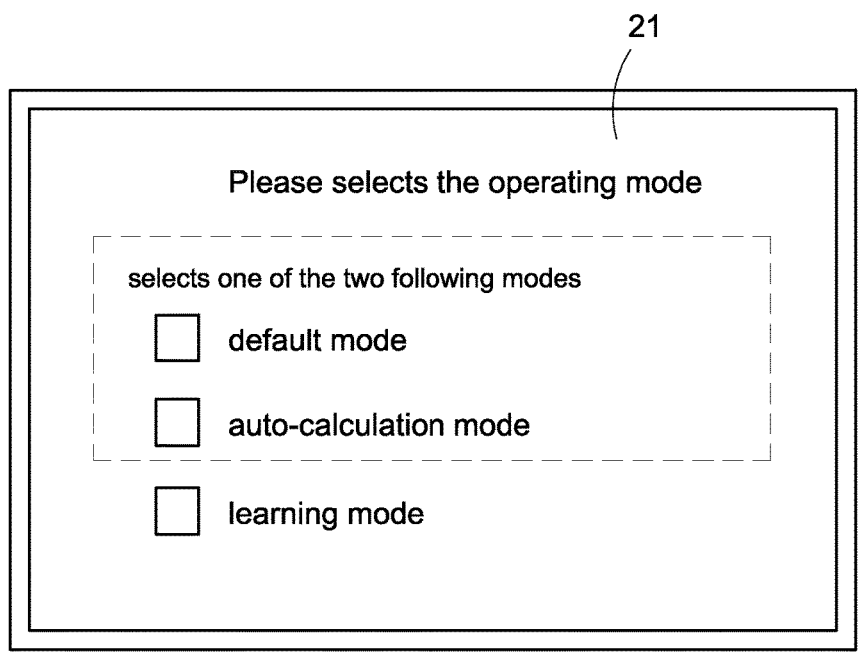
FIG. 2 is a schematic view of a human machine interface of a first embodiment according to the present invention.

FIG. 2 is a schematic view of a human machine interface of a first embodiment according to the present invention. As shown in FIG. 2, when the system works initially, it displays a selection page for the user to select operating modes through a display monitor 21 of the HMI 2. The user can select a default mode or an auto-calculation mode for the system to work through the selection page. Further, the user can decide if the system needs to enable a learning mode or not.

In particularly, the climate and the environment in different country and/or different area are distinct from each other, and the user has different comfort feeling in different place. The system in the present invention can further comprise a global positioning system (GPS, not shown) for determining which country and/or which area the system is now located (for example, Taipei city in Taiwan or New York city in the USA). Else, the system can further provide an area selection page for the user to manually select or input a located country or a located area of the system. In this embodiment, the default mode applies different default value in accordance with the located country or the located area of the system, it does not apply same default value for every country and every area. As a result, the default mode is used to be an area-related setting mode, and the default mode applies one of the plurality of pre-stored default values in accordance with the located position of the system. Each of the plurality of default values mentioned above is corresponding to different country and/or different area respectively in this embodiment, but not limited thereto.

The default control procedure 11 applies a corresponding default value in accordance with the located country or the located area of the system, so as to control the indoor apparatuses 3 appropriately. Each of the plurality of default values mentioned above comprises a corresponding temerature and a corresponding humidity respectively. In other embodiments, the auto-control procedure 12 applies a corresponding algorithm to calculate a best comfort-index and a target comfort temperature/humidity based on the located country and/or the located area of the system. In this case, no matter the system is used in which country or which area, it can satisfy the demands for the comfort from local users. Besides, through other sensors and selection pages, the system can further receive a type of the indoor space Z1 (for example, an office, a meeting room, a storage, a factory or a lobby), current date (a working day or a holiday), and time (in the morning or in the afternoon). Therefore, the system can get more and more detailed environment parameters and execute accurate controls.

If the user selects the default mode, the controlling apparatus 1 will apply the default control procedure 11 while the system is working. If the user selects the auto-calculation mode, the controlling apparatus 1 will apply the auto-calculation procedure 12 while the system is working.

If the user selects the learning mode, the controlling apparatus 1 will apply the learning procedure 13 with the default control procedure 11 or the auto-calculation mode 12 at the same time, and the controlling apparatus 1 learns user demands through the learning procedure 13 to build or update the learning models 131. In this embodiment, the controlling apparatus 1 can build and record one or more of the learning models 131, not limited thereto. If there are more than one learning models 131 in the controlling apparatus 1, each of the plurality of learning models 131 is corresponding to different space, time, date, temperature or humility, and is applied for different indoor environment respectively.

In particularly, if the user selects the learning mode, the controlling apparatus 1 firstly obtains the environment parameters indoor and/or outdoor through the sensors 4 when a person enters the indoor space Z1, then the controlling apparatus 1 selects one of the plurality of learning models 131 which has the environment parameters same as the current environment parameters of the indoor space Z1, and decides a target temperature/humidity to control the plurality of indoor apparatuses 3 based on the selected learning model 131. On the contrary, if the controlling apparatus 1 does not build the learning model 131 yet, or the plurality of learning models 131 of the controlling apparatus 1 do not suit for the current environment parameters, the controlling apparatus 1 uses the default mode or the auto-calculation mode to decides the target temperature/humidity to control the plurality of indoor apparatuses 3. As mentioned above, the controlling apparatus 1 applies the default mode or the auto-calculation mode based on the operation of the user through the HMI 2.

Figure 3:
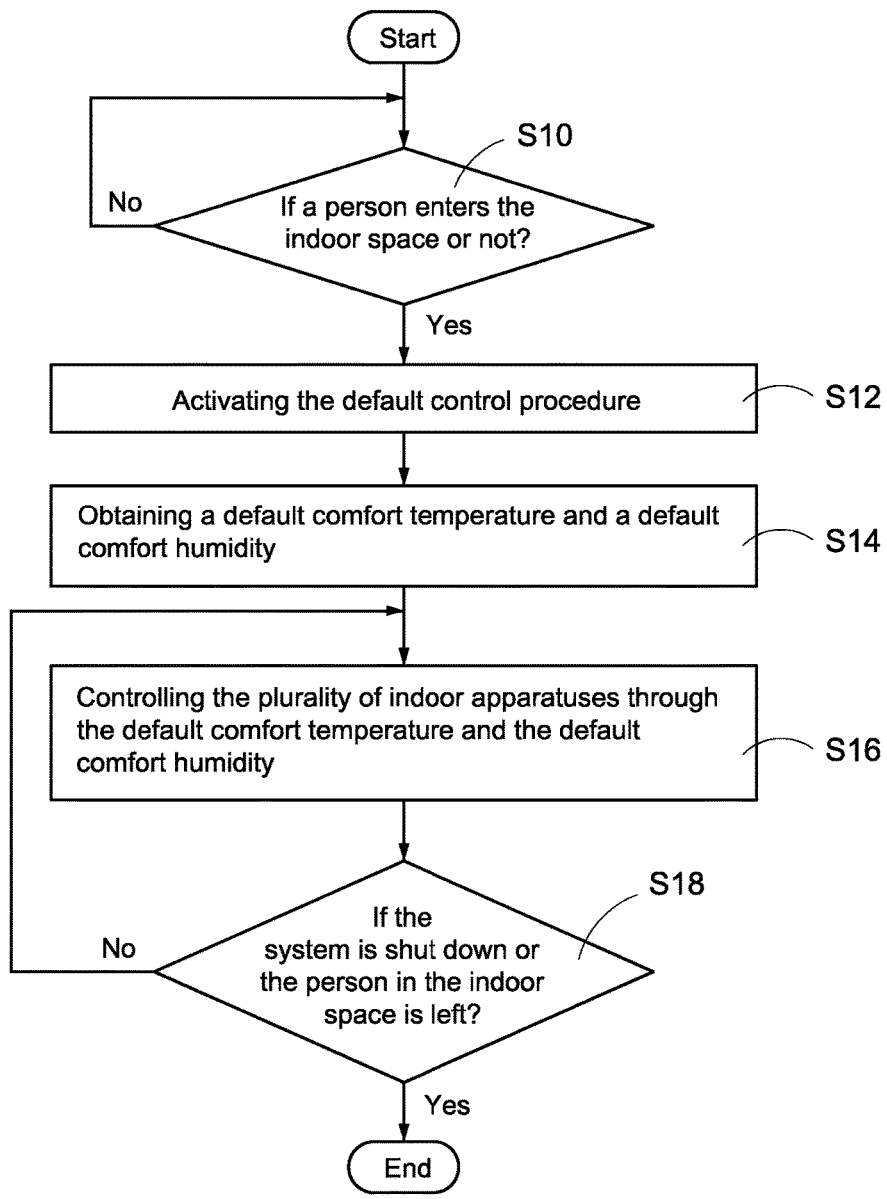
FIG. 3 is a flowchart for default control of a first embodiment according to the present invention.

FIG. 3 is a flowchart for default control of a first embodiment according to the present invention. If the system applies the default mode based on the operation of the user, the system will work according to the following steps as shown in FIG. 3. Firstly, the system keeps detecting if a person enters the indoor space Z1 or not continually through at least one of the plurality of sensors 4 (step S10). In this invention, the system can detect if a person enters the indoor space Z1 through a thermos sensor, an IR sensor or a monitor. If a person is detected indoor, the controlling apparatus 1 activates the default control procedure 11 (step S12). It should be mentioned that the controlling apparatus 1 can activates the default control procedure 11 immediately after the default mode is selected by the user through the HMI 2, else, the controlling apparatus 1 can activate the default control procedure 11 only after the person is detected in the indoor space Z1, but not limited thereto.

After being activated, the default control procedure 11 is executed to obtain a default comfort temperature and a default comfort humidity set by the user or a manufacturer of the system (step S14), therefore, the controlling apparatus 1 can control the plurality of indoor apparatuses 3 through the default comfort temperature and the default comfort humidity (referred to as the default comfort temperature/humidity hereinafter) to adjust the comfort degree of the indoor space Z1 (step S16).

The default comfort temperature/humidity can also be a default comfort temperature/humidity range, for example, 24° C. to 25.5° C. In this case, if the user has a power saving purpose, the controlling apparatus 1 can control the indoor apparatuses 3 in accordance with a higher temperature/humidity in the default comfort temperature/humidity range, so as to save power in the meantime adjusting the comfort degree of the indoor environment of the indoor space Z1.

As mentioned above, the default control procedure 11 can comprise only one set of the default comfort temperature/humidity, or comprise multiple sets of the default comfort temperature/humidity for being applied for different country, area, date, time, or type of the indoor space Z1 respectively. If the default control procedure 11 comprises multiple sets of the default comfort temperature/humidity, the controlling apparatus 1 can apply an appropriate set of the default comfort temperature/humidity to control the indoor apparatuses 3 in accordance with the current environment parameters (for example, in Asia or in America, in an office or in a factory, in working day or in holidy, in the morning or in the afternoon). Therefore, even the system is moved to a different environment, it can still adjust the current environment to reach a best comfort condition immediately after being booted.

In this embodiment, the controlling apparatus 1 keeps controlling the indoor apparatuses 3, so as to keep the indoor space Z1 in a best comfort condition. In the meantime, the controlling apparatus 1 keeps determining if the system is shut down or not, or if the person in the indoor space Z1 is left or not (step S18). If yes, the system shuts down for saving power. It should be mentioned is the system can also activate a carbon dioxide monitoring procedure (now shown) of the controlling apparatus 1 when detecting the person enters the indoor space Z1. The carbon dioxide monitoring procedure controls one of the plurality of indoor apparatuses 3 (such as the circulation fan) for adjusting the amount of carbon dioxide of the indoor space Z1. Therefore, the system in this invention can adjust indoor temperature, humidity and quality of air at the same time, and make the user feel comfortable.

Figure 4:
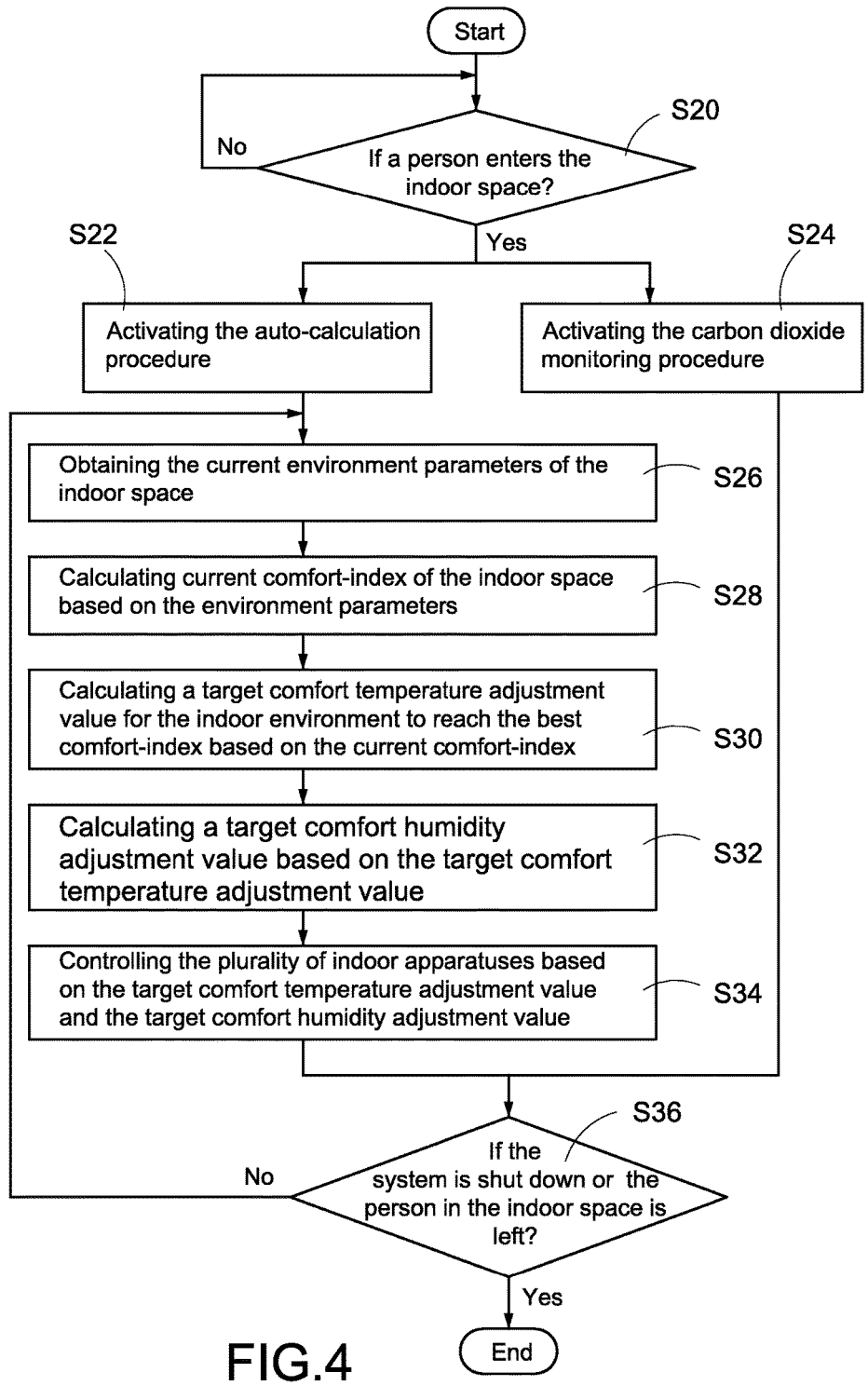
FIG. 4 is a flowchart for auto-calculation control of a first embodiment according to the present invention.

FIG. 4 is a flowchart for auto-calculation control of a first embodiment according to the present invention. If the system applies the auto-calculation mode based on the operation of the user, the system will work according to the following steps as shown in FIG. 4. Firstly, the system keeps detecting if a person enters the indoor space Z1 or not continually through at least one of the plurality of sensors 4 (step S20), and if a person is detected indoor, the controlling apparatus 1 activates the auto-calculation procedure 12 (step S22). At the same time, the controlling apparatus 1 can also activate the carbon dioxide monitoring procedure mentioned above (step S24). Also, the auto-calculation procedure 12 is activated immediately after the auto-calculation mode is selected by the user through the HMI 2 or activated after the person is detected in the indoor space Z1.

After the auto-calculation procedure 12 is activated, the controlling apparatus 1 obtains the current environment parameters through the plurality of sensors 4 (step S26), wherein the current environment parameters mentioned here comprises environment parameters in the indoor space Z1 and environment parameters out of the indoor space Z1. In this embodiment, the current environment parameters at least includes temperature, radiant temperature, humidity, air velocity, activity of person and clothing of person, but not limited thereto. After the step S26, the auto-calculation procedure 12 calculates a current comfort-index of the indoor space Z1 based on those environment parameters obtained from the sensors 4 (step S28).

The above mentioned comfort-index can be, for example, the index of a comfort zone defined by ASHARE Standard 55 of ASHARE. The comfort zone defined by ASHARE is appropriate for about 80% people, and the index of the comfort zone comprises seven degrees (which is −3 to +3), wherein −3 is defined as very cold, 0 is defined as comfortable, and +3 is defined as very hot. The comfort-index in this invention can be a value between −3 to +3, which indicates a current comfortable level felt by the user in the indoor zone Z1. However, the above description is just a specific embodiment, the system in this invention can apply other standard than the ASHARE Standard 55, for example, the comfort-index can be set between −5 to +5, not intended to limit the scope of this invention.

The main object of this invention is to adjust the indoor environment to reach the best comfort-index. After the step S28, the system can obtain the current comfort-index of the indoor space Z1 (for example, one value between −3 to +3). The auto-calculation procedure 12 calculates a target comfort temperature adjustment value for the indoor environment to reach the best comfort-index (for example, the value "0" in this embodiment) based on the current comfort-index (step S30). For example, if the best temperature for the current environment parameters is 26° C., then the comfort-index will be "0" when the temperature indoor reaches to 26° C. As a result, if the real temperature indoor now is 29° C., and the current comfort-index is "+2", the auto-calculation procedure 12 can find out that the target comfort temperature adjustment value is "−3° C." for the indoor environment to change the current comfort-index from "+2" to "0".

Besides, different humidity in different temperature can affect user's feelings, too. After the step S30, the auto-calculation procedure 12 can also calculate a target comfort humidity adjustment value based on the target comfort temperature adjustment value (step S32). For example, if the best humidity is 50% when the temperature indoor is 26° C., while the real humidity indoor now is 70%, then the auto-calculation procedure 12 can find out that the target comfort humidity adjustment value is "−20%".

After the step S32, the controlling apparatus 1 controls the plurality of indoor apparatuses 3 based on the calculated target comfort temperature adjustment value and the calculated target comfort humidity adjustment value (step S34), so as to adjust the indoor environment to reach a target temperature and a target humidity. In this embodiment, the auto-calculation procedure 12 calculates the above mentioned "adjustment value", so the controlling apparatus 1 mainly controls the indoor apparatuses 3 by commanding "increases/decreases the temperature n° C." or "increases/decreases the humidity m %". However, in other embodiments, the auto-calculation procedure 12 can calculate a certain target comfort temperature and a target comfort humidity, and the controlling apparatus 1 can command the indoor apparatuses to operate toward the target comfort temperature and the target comfort humidity directly.

Furthermore, the best comfort-index in the auto-calculation mode can be a best comfort range as described in the default mode (for example, between −1 to +1). In this case, the auto-calculation procedure 12 calculates a target comfort temperature adjustment range for the indoor environment to reach the best comfort range in the step S30. For example, if the best temperature is 24° C. to 25.5° C. for the current environment parameters, and a comfort range will be −1 to +1 when the temperature indoor is between 24° C. to 25.5° C. As a result, if the real temperature indoor now is 29° C., and the current comfort-index is +2, the auto-calculation procedure 12 can find out that the target comfort temperature adjustment range is −3.5° C. to −5° C. for the indoor environment to change the current comfort-index from +2 to a value between −1 to +1.

As described, the auto-calculation procedure 12 can also calculate a target comfort humidity adjustment range by the same way in the step S32. And, if the auto-calculation procedure 12 applies the target comfort temperature adjustment range and the target comfort humidity adjustment range to control the plurality of indoor apparatuses 3, the controlling apparatus 1 can use a higher temperature/humidity in the target comfort temperature adjustment range and the target comfort humidity adjustment range to control the plurality of indoor apparatuses 3 for saving power in the meantime adjusting the comfort degree of the indoor environment.

After the step S34, the controlling apparatus 1 determines if the system is shut down or not, or if the person in the indoor space Z1 is left or not (step S36). If the system is not shut down, and the person stays in the indoor space Z1, then the procedure is back to the step S26, the plurality of sensors 4 keeps obtaining the current environment parameters, the auto-calculation procedure 12 keeps calculating the best target comfort temperature adjustment value (or the target comfort temperature adjustment range) and the target comfort humidity adjustment value (or the target comfort humidity adjustment range), and the controlling apparatus 1 keeps controlling the plurality of indoor apparatuses 3. On the contrary, if the system is shut down, or the person in the indoor space Z1 is left, then the auto-calculation procedure 12 ends.

The auto-control system in the related art has a problem that the system usually sets a target (for example, set the temperature indoor to 20° C.) which can not ever be reached. Generally speaking, there are many external forces causing the indoor temperature fails to decrease, for example, too many people indoor, opened windows, air-conditioner is too old to reach the target or the user eats hot food indoor, etc.

For making sure if the system can reach the target temperature and the target humidity set in advance according to the purpose, this invention discloses detailed technical solutions as shown below.

Figure 5:
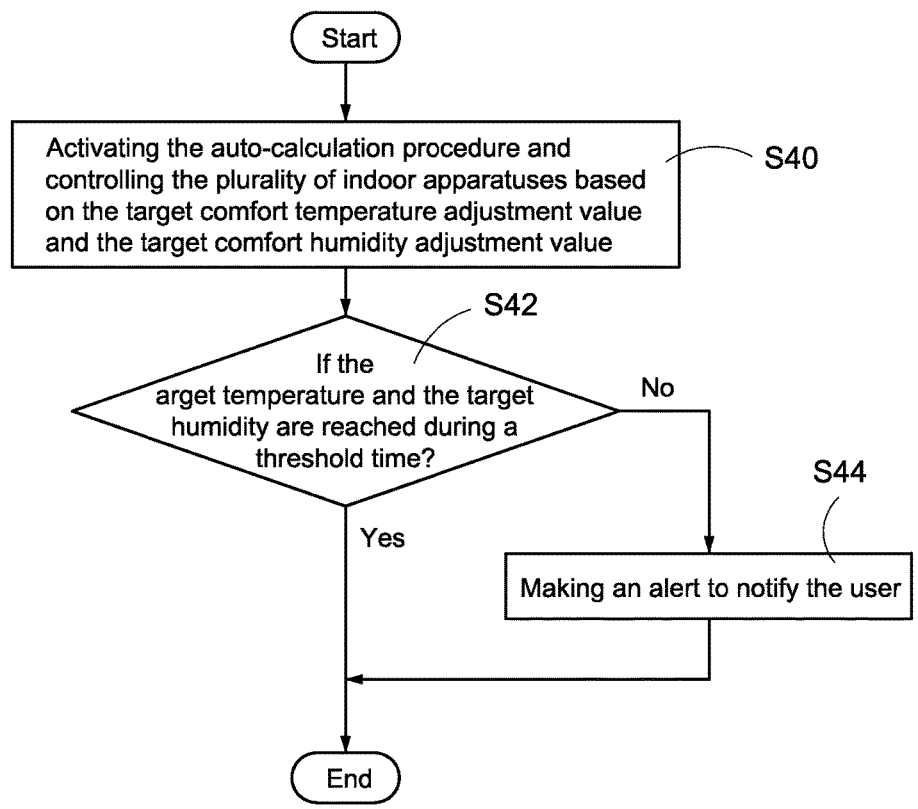
FIG. 5 is a flowchart for alerting of a first embodiment according to the present invention.

FIG. 5 is a flowchart for alerting of a first embodiment according to the present invention. The controlling apparatus 1 activates the auto-calculation procedure 12 for calculating the target comfort temperature adjustment value and the target comfort humidity adjustment value (referred to as the target comfort temperature/humidity adjustment value hereinafter), and controls the plurality of indoor apparatuses 3 based on the calculated target comfort temperature/humidity adjustment value (step S40). Then, the controlling apparatus 1 keeps determining if the indoor environment is adjusted to reach the target temperature and the target humidity during a threshold time (step S42). If yes, the controlling apparatus 1 does not execute additional actions, otherwise, the controlling apparatus 1 makes an alert to notify the user (step S44).

In this embodiment, the threshold time is a default value of the system, or a setting value set by the user through the HMI 2, not limited thereto. The controlling apparatus 1 alerts the user through lighting or sending images or voices by the HMI 2, or sending messages or e-mails to the user, not limited thereto. If the user receives a notification from the controlling apparatus 1, he or she can check the indoor space Z1 for determining the failed reach of the target temperature and the target humidity is caused by environment problems (for example, opened windows or too much people indoor) or apparatus problems (for example, the air-conditioner is too old), and the user can solve the problems directly, or re-set a new target temperature and a new target humidity manually.

Figure 6:
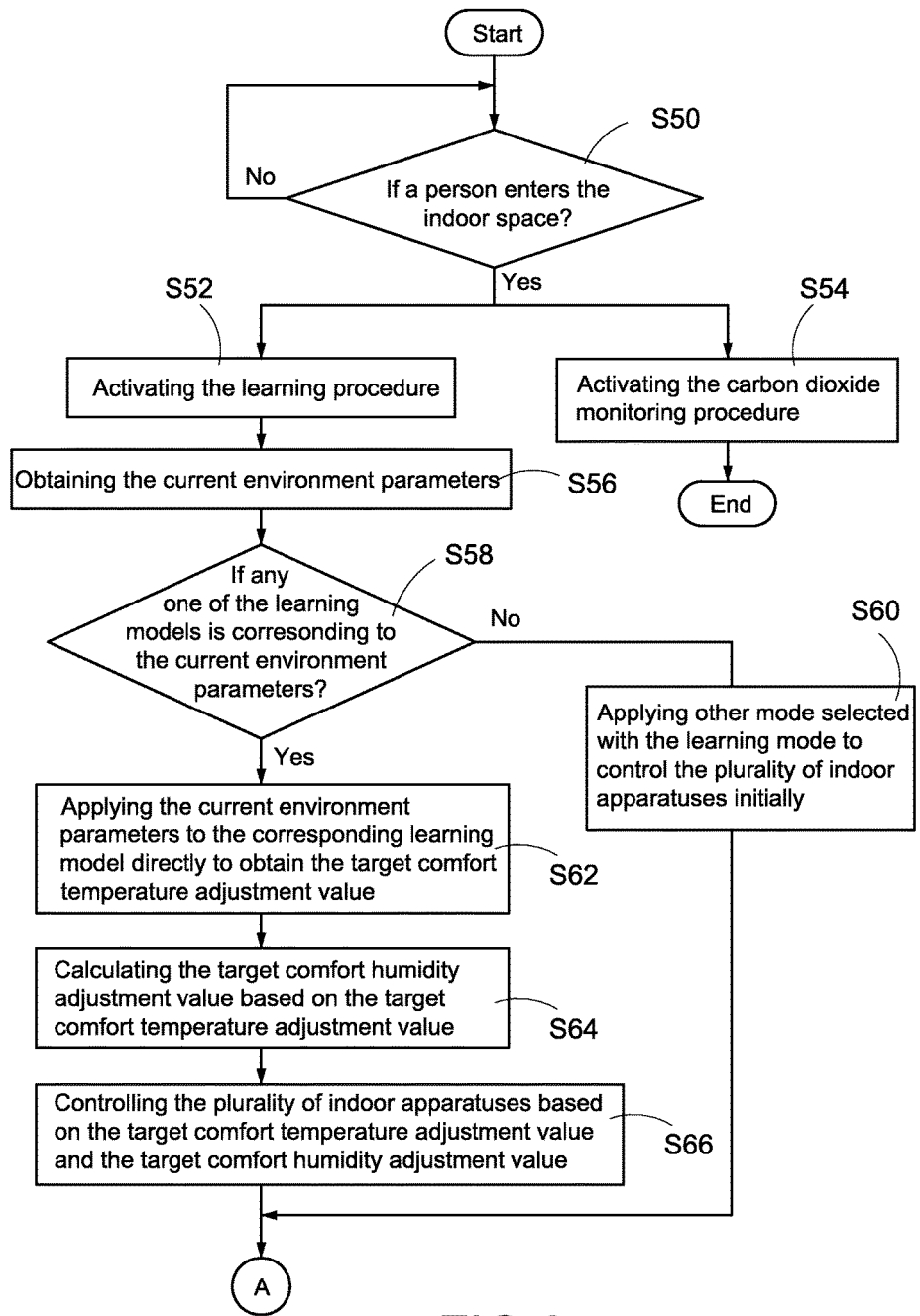
FIG. 6 is a flowchart for first learning control of a first embodiment according to the present invention.
Figure 7:
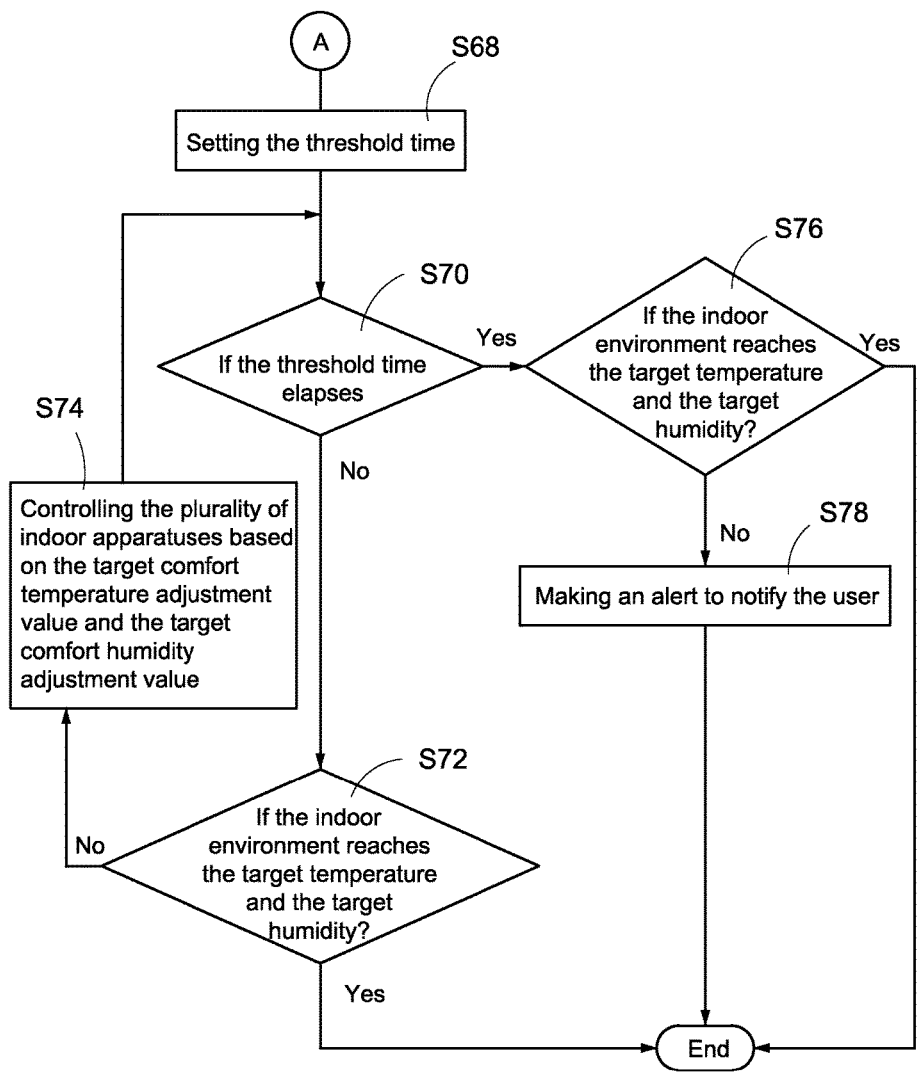
FIG. 7 is a flowchart for second learning control of a first embodiment according to the present invention.
Figure 8:
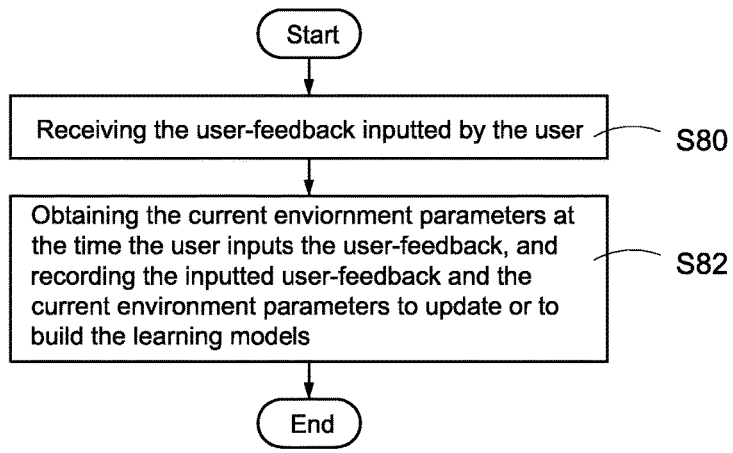
FIG. 8 is a flowchart for third learning control of a first embodiment according to the present invention.

FIG. 6 is a flowchart for first learning control of a first embodiment according to the present invention. FIG. 7 is a flowchart for second learning control of a first embodiment according to the present invention. FIG. 8 is a flowchart for third learning control of a first embodiment according to the present invention. If the system applies the learning mode based on the operation of the user, the system will work according to the following steps as shown in FIG. 6, FIG. 7 and FIG. 8. Firstly, the system keeps detecting if a person enters the indoor space Z1 or not through at least one of the plurality of sensors 4 (step S50), and if a person is detected indoor, the controlling apparatus 1 activates the learning procedure 13 (step S52). At the same time, the controlling apparatus 1 can also activate the carbon dioxide monitoring procedure mentioned above (step S54).

In this embodiment, the user can select the default mode and the learning mode at the same time. In particularly, the system in this embodiment controls the plurality of indoor apparatuses 3 initially by using one of the learning models 131 which is corresponding to the current environment parameters in advance, and applies the default control procedure 11 to control the plurality of indoor aparatuses 3 initially if none of learning model 131 is corresponding to the current envrionment parameters. Also, the system updates the current learning models 131 or builds new learning models 131 when the user adjusts the target temperature or the target humidity manually through the learning procedure 13 (as shown in FIG. 8).

Otherwise, the user can select the auto-calculation mode and the learning mode at the same time. In particularly, the system in this embodiment controls the plurality of indoor apparatuses 3 initially by using one of the learning models 131 which is corresponding to the current environment parameters in advance, and applies the auto-calculate procedure 12 to control the plurality of indoor aparatuses 3 initially if none of learning model 131 is corresponding to the current envrionment parameters. Also, the system updates the current learning models 131 or builds new learning models 131 in this embodiment when the user adjusts the target temperature or the target humidity manually through the learning procedure 13.

Back to FIG. 6, the system obtains the current environment parameters indoor and/or outdoor through the plurality of sensors 4 through the learning procedure 13 after the learning procedure 13 is activated (step S56). The learning procedure 13 then determines if any one of the learning models 131 in the controlling apparatus 1 is corresponding to the current environment parameters (step S58). If the controlling apparatus 1 does not build any learning model 131 yet, or none of learning model 131 in the controlling apparatus 1 is corresponding to any one of the current envrionment parameters, the controlling apparatus 1 applies other mode co-selected with the learning mode at the same time (such as the default mode or the auto-calculation mode) to control the plurality of indoor apparatuses 3 initially (step S60), so as to set a default value for the indoor apparatuses 3.

On the other hand, if the controlling apparatus 1 has one of the learning models 131 which is corresponding to the current environment parameters, the learning procedure 13 applies the current environment parameters to the corresponding learning model 131 directly to obtain the target comfort temperature adjustment value (or the target comfort temperature adjustment range) (step S62). In the meantime, the learning procedure 13 calculates the target comfort humidity adjustment value (or the target comfort humidity adjustment range) based on the target comfort temperature adjustment value (or the target comfort temperature adjustment range) (step S64). Finally, the controlling apparatus 1 controls the plurality of indoor apparatuses 3 based on the target comfort temperature adjustment value and the target comfort humidity adjustment value (step S66), so as to adjust the indoor environment to reach the target temperature and the target humidity. If the indoor environment is adjusted to reach the target temperature and the target humidity, then it can satisfy the user demands inputted to the system by the user in advance.

As shown in FIG. 7, the user can set the above mentioned threshold time through the HMI 2 (step S68), else, the threshold time can be a default value of the system, not limited thereto. In this embodiment, the controlling apparatus 1 keeps determining if the threshold time (such as 15 minutes, half hour or 1 hour) is reached or not (step S70). Before the threshold time is reached, the controlling apparatus 1 keeps determining if the indoor environment reaches the target temperature and the target humidity (or the target comfort temperature/humidity range) or not (step S72). If the indoor environment reaches the target temperature and the target humidity, the control action of the controlling apparatus 1 for this process flow ends. Otherwise, the controlling apparatus 1 keeps controlling the plurality of indoor apparatuses 3 based on the calculated target comfort temperature/humidity adjustment value to adjust the indoor environment before the indoor environment reaches the target temperature and the target humidity (step S74). The controlling apparatus 1 keeps determining if the threshold time is reached after the step S74.

After the threshold time is reached, the controlling apparatus 1 determines if the indoor environment reaches the target temperature and the target humidity or not (step S76). If yes, the controlling apparatus 1 does not execute additional actions, otherwise, the controlling apparatus 1 makes an alert to notify the user (step S78).

As shown in FIG. 8, if the learning mode is selected, the learning procedure 13 can receive a user-feedback inputted by the user (for example, the user sets a target temperature manually through the HMI 2) in any time, and the learning procedure 13 uses the user-feedback to update the current learning models 131, or builds new learning models 131. The method for learning the user-feedback is detailed described below.

In particularly, before the threshold time elapses, or after the threshold time elapses, or before the indoor environment reaches the target temperature and the target humidity, or after the indoor environment reaches the target temperature and the target humidity (i.e., the indoor environment is stable), the controlling apparatus 1 can receive the user-feedback inputted by the user (step S80). After the step S80, the learning procedure 13 is executed to obtain the current environment parameters through the plurality of sensors 4 at the time the user inputs the user-feedback, and the learning procedure 13 records the inputted user-feedback and the current environment parameters to update or to build one of the learning models 131 (step S82). More specific, the learning procedure 13 records the user-feedback inputted by the user, and records the current environment parameters at the time the user-feedback is inputted, then builds a new learning model 131 in view of the user-feedback and the current environment parameters. However, if the controlling apparatus 1 has one of the learning models 131 which is corresponding to the inputted user-feedback, it updates the corresponding learning model 131 based on the received user-feedback, but not build the new learning model 131.

It should be mentioned is the user can input the user-feedback at any time, and the controlling apparatus 1 adjusts the target temperature and the target humidity in accordance with the inputted user-feedback. In this embodiment, however, the user-feedback is deemed an available user-feedback by the controlling apparatus 1 only when the adjusted target temperature and the adjusted target humidity, adjusted in accordance with the user-feedback, can be reached within the threshold time Also, only the available user-feedback will be used to update the current learning models 131 or to build the new learning model 131. For example, if a user-feedback inputted by the user is to adjust the indoor temperature to 5° C. or to 40° C., the controlling apparatus 1 will considers the user-feedback as a mistake and does not add the user-feedback into the learning models 131 this time because it is not able to be reached.

If the learning mode is selected, the user-feedback inputted by the user will be received and learnt continually by the system, so as to update or build the learning models 131 by the controlling apparatus 1. However, if a user demand is changed before the threshold time elapses, then the advanced user-feedback is considered as an invalid user-feedback. In this embodiment, the learning procedure 13 ignores the advance user-feedback and do not add it into the learning models 131. In other words, the user-feedback which is not able to be reached or is covered by following user-feedback inputted by the user before the threshold time elapses will not be recorded by the learning procedure 13, and not be added into the learning models 131.

In this invention, the system provides a corresponding feedback interface through the HMI 2 for the user to manually input the user-feedback related to the comfort degree of the current indoor environment. Generally, the user-feedback can be vague and indirect information (such as a too hot complaining), and the user-feedback can also be concrete and direct information (such as setting the target temperature to 26° C. or decreasing the indoor temperature 1° C.).

If the user-feedback is the direct information, the system can generate the target comfort temperature/humidity adjustment value (or the target comfort temperature/humidity adjustment range) based on the user-feedback directly, and control the indoor apparatuses 3 based on the generated target comfort temperature/humidity adjustment value. On the contrary, if the user-feedback is the indirect information, the system needs to transform the indirect information into the direct information based on the current environment parameters in advance, and then generates the target comfort temperature/humidity adjustment value based on the transformed direct information, and finally controls the indoor apparatuses 3 based on the generated target comfort temperature/humidity adjustment value. For example, if the current indoor temperature now is 30° C., and the user sends inputs indicating too hot complaint three times through the feedback interface, the system can transform the indirect information indicating the three times of too hot complaint into the direct information indicating "decreasing temperature 3° C.". However, the above mentioned description is just a specific embodiment of the present invention, not intended to limit the scope of the present invention.

Figure 9:
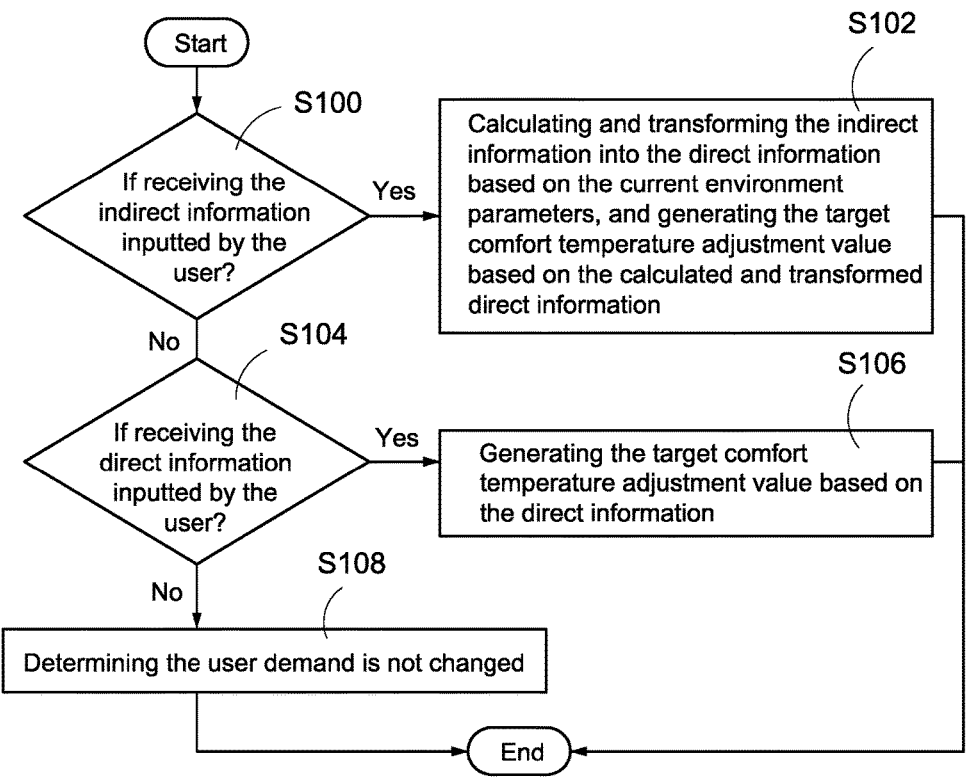
FIG. 9 is a flowchart for user setting of a first embodiment according to the present invention.

FIG. 9 is a flowchart for user setting of a first embodiment according to the present invention. When receiving the user-feedback, the controlling apparatus 1 determines if receiving the indirect information inputted by the user or not (step S100). If yes, the controlling apparatus 1 calculates and transforms the indirect information into the direct information based on the current environment parameters, and generates the target comfort temperature adjustment value based on the calculated and transformed direct information (step S102).

If the controlling apparatus 1 does not receive the indirect information in the step S100, it determines if receiving the direct information inputted by the user or not (step S104). If yes, the controlling apparatus 1 generates the target comfort temperature adjustment value based on the direct information directly (step S106). It should be mentioned is the user can input the indirect information and/or the direct information through interfaces provided by the HMI 2 of the controlling apparatus 1, so the step S100 and the step S104 can be executed at the same time, there does not exist an execution sequence.

Besides, if not receiving the indirect information in the step S100 and not receiving the direct information in the step S104, the controlling apparatus 1 determines the user demand is not changed (step S108), in other words, the user does not input any of the user-feedback.

As the skilled person will appreciate, various changes and modifications can be made to the described embodiment. It is intended to include all such variations, modifications and equivalents which fall within the scope of the present invention, as defined in the accompanying claims.

What is claimed is:

1. A controlling system for environmental comfort degree, comprising:
    a plurality of sensors for sensing a plurality of environment parameters indoor or outdoor;
    a plurality of indoor apparatuses for adjusting temperature and humidity of an indoor space;
    a controlling apparatus, operatively connected with the sensors and the indoor apparatuses, executing an auto-calculation procedure for calculating a current comfort-index of the indoor space based on the environment parameters, and calculating a target comfort temperature adjustment value and a target comfort humidity adjustment value for an indoor environment of the indoor space to reach a best comfort-index based on the current comfort-index;
    wherein the controlling apparatus controls the indoor apparatuses based on the target comfort temperature adjustment value and the target comfort humidity adjustment value for the indoor environment to reach a target temperature and a target humidity; and
    wherein, the controlling apparatus determines whether the controlling system is shut down and whether a person in the indoor space is left, if the controlling system is not shut down and the person stays in the indoor space, then the plurality of sensors re-sense the environment parameters, the controlling apparatus re-calculates the current comfort-index based on the environment parameters, re-calculates the target comfort temperature adjustment value and the target comfort humidity adjustment value based on the current comfort-index, and re-controls the indoor apparatuses based on the target comfort temperature adjustment value and the target comfort humidity adjustment value.

2. The controlling system in claim 1, wherein the current comfort-index and the best comfort-index are indexes of a comfort zone defined by ASHRAE Standard 55 of ASHRAE.

3. The controlling system in claim 1, wherein the plurality of sensors comprises a thermos sensor, an IR sensor or a monitor, for detecting if a person enters the indoor space, and the controlling apparatus calculates the target comfort temperature adjustment value and the target comfort humidity adjustment value when the person enters the indoor space.

4. The controlling system in claim 1, wherein the controlling apparatus executes a learning procedure for establishing or updating a learning model when receiving a user-feedback, wherein the learning model comprises the user-feedback, and the environment parameters sensed at the time the user-feedback is inputted.

5. The controlling system in claim 4, wherein the learning procedure re-calculates the target comfort temperature adjustment value and the target comfort humidity adjustment value for the indoor environment of the indoor space to reach the user-feedback based on the environment parameters, and the controlling apparatus controls the indoor apparatuses based on the re-calculated target comfort temperature adjustment value and the re-calculated target comfort humidity adjustment value.

6. The controlling system in claim 4, further comprising a human machine interface (HMI), connected to the controlling apparatus, and the HMI comprises a selection page for selecting one of a plurality of operating modes.

7. The controlling system in claim 6, wherein the operating modes comprise an auto-calculation mode and a learning mode, and the controlling apparatus applies the auto-calculation procedure to operate when the auto-calculation mode is selected and applies the learning procedure to operate when the learning mode is selected.

8. The controlling system in claim 7, wherein the learning procedure determines if the learning model is corresponding to the current environment parameters, applies the environment parameters to the learning model to find out the target comfort temperature adjustment value and the target comfort humidity adjustment value directly if the learning model is corresponding to the current environment parameters, and calculates the target comfort temperature adjustment value and the target comfort humidity adjustment value through the auto-calculation procedure if the learning model is not corresponding to the current environment parameters.

9. A controlling method for environmental comfort degree, used by a controlling system, the controlling system comprising a plurality of indoor apparatuses, a plurality of sensors and a controlling apparatus operatively connected with the indoor apparatuses and the sensors, the controlling method comprising:
   a) sensing if a person enters an indoor space;
   b) obtaining a plurality of environment parameters indoor or outdoor by the sensors when the person enters the indoor space;
   c) calculating a current comfort-index of the indoor space based on the environment parameters at the controlling apparatus;
   d) calculating a target comfort temperature adjustment value for reaching a best comfort-index based on the current comfort-index;
   e) calculating a target comfort humidity adjustment value based on the target comfort temperature adjustment value; and
   f) controlling the indoor apparatuses based on the target comfort temperature adjustment value and the target comfort humidity adjustment value at the controlling apparatus for an indoor environment of the indoor space to reach a target temperature and a target humidity;
   g) determining if the controlling system is shut down;
   h) determining if the person in the indoor space is left; and
   i) re-executing the step b to the step f if the controlling system is not shut down and the person stays in the indoor space.

10. The controlling method in claim 9, further comprising a step j:
   activating a carbon dioxide monitoring procedure at the controlling apparatus when the person enters the indoor space, wherein the carbon dioxide monitoring procedure controls one of the indoor apparatuses for adjusting an amount of carbon dioxide of the indoor space.

11. The controlling method in claim 9, further comprising following steps of:
   k) determining if reaching the target temperature and the target humidity before a threshold time elapses; and
   l) making an alert if the target temperature and the target humidity is not reach yet when the threshold time elapses.

12. The controlling method in claim 11, further comprising a step k0 before the step k: receiving the threshold time inputted by a user.

13. The controlling method in claim 11, further comprising following steps of:
   m) receiving a user-feedback;
   n) establishing or updating a learning model based on the user-feedback, wherein the learning model comprises the user-feedback, and the environment parameters sensed at the time the user-feedback is received;
   o) re-calculating the target comfort temperature adjustment value and the target comfort humidity adjustment value based on the environment parameters for reaching the user-feedback; and
   p) controlling the indoor apparatuses based on the re-calculated target comfort temperature adjustment value and the re-calculated target comfort humidity adjustment value.

14. The controlling method in claim 13, wherein the user-feedback is indirect information or direct information, and the step m comprises following steps of:
   m0) determining if receiving the indirect information;
   m1) transforming the indirect information into the direct information in accordance with the environment parameters if receiving the indirect information;
   m2) determining if receiving the direct information; and
   m3) generating the target temperature and the target humidity based on the direct information.

15. The controlling method in claim 13, wherein the controlling system comprises a learning mode, and further comprises following steps after the step b:
   q) determining if the learning model is corresponding to the environment parameters;

r) applying the environment parameters to the learning model to find out the target comfort temperature adjustment value and the target comfort humidity adjustment value directly if the learning model is corresponding to the environment parameters;

s) controlling the indoor apparatuses based on the target comfort temperature adjustment value and the target comfort humidity adjustment value after the step r; and t) executing the step c to the step f if the learning model is not corresponding to the environment parameters.

16. A controlling method for environmental comfort degree, used by a controlling system and comprising:

a) sensing if a person enters an indoor space;

b) obtaining a plurality of environment parameters indoor or outdoor through a plurality of sensors of the controlling system when the person enters the indoor space;

c) determining if the controlling system has a learning model corresponding to the environment parameters;

d) controlling a plurality of indoor apparatuses of the controlling system initially through an auto-calculation mode if the controlling system does not have the learning model corresponding to the environment parameters, wherein step d) comprises:

d1) calculating a current comfort-index based on the environment parameters;

d2) calculating a target comfort temperature adjustment value based on the current comfort-index for reaching a best comfort-index;

d3) calculating a target comfort humidity adjustment value based on the target comfort temperature adjustment value; and d4) controlling the indoor apparatuses based on the target comfort temperature adjustment value and the target comfort humidity adjustment value at the controlling apparatus for the indoor environment of the indoor space to reach a target temperature and a target humidity;

e) applying the environment parameters to the learning model to find out the target comfort temperature adjustment value directly if the controlling system has the learning model corresponding to the environment parameters;

f) calculating the target comfort humidity adjustment value based on the target comfort temperature adjustment value after the step e;

g) controlling the indoor apparatuses based on the target comfort temperature adjustment value and the target comfort humidity adjustment value for the indoor environment of the indoor space to reach the target temperature and the target humidity after the step f:

h) determining if the target temperature and the target humidity is reached before a threshold time elapses; and i) making an alert if the target temperature and the target humidity is not reached when the threshold time elapses.

17. The controlling method in claim 16, further comprising following steps of:

j) determining if receiving a user-feedback, wherein the user-feedback is indirect information or direct information;

k) establishing or updating the learning model when receiving the user-feedback, wherein the learning model comprises the user-feedback, and the environment parameters sensed at the time the user-feedback is received;

l) re-calculating the target comfort temperature adjustment value and the target comfort humidity adjustment value based on the environment parameters for reaching the user-feedback; and M) controlling the indoor apparatuses based on the re-calculated target comfort temperature adjustment value and the re-calculated target comfort humidity adjustment value.

* * * * *